United States Patent
Yoshimoto et al.

[11] Patent Number: 5,975,505
[45] Date of Patent: Nov. 2, 1999

[54] MOUNT INSULATOR

[75] Inventors: Yoshiaki Yoshimoto; Chikara Itoh, both of Kanagawa-ken, Japan

[73] Assignee: Nissan Motor Co., Ltd., Kanagawa-ken, Japan

[21] Appl. No.: 08/832,842

[22] Filed: Apr. 4, 1997

[30] Foreign Application Priority Data

Apr. 10, 1996 [JP] Japan .................................. 08-088439

[51] Int. Cl.⁶ .............................. B60G 13/00; F16F 9/54
[52] U.S. Cl. .......................... 267/33; 267/220; 267/293; 267/294; 267/141.1; 267/141.5
[58] Field of Search .................... 267/220, 294, 267/141.4, 141.5, 141.7, 33, 293, 141.1, 140.3, 140.4, 152, 153, 195, 292, 221, 219, 140.2, 160.5, 225; 280/124.147, 124.155, 124.151, 124.177, 124.179, 124.165, 124.145; 248/634, 635, 619–621; 188/321.11; 384/144, 124, 607, 125, 130, 420; 403/326, 224, 282, 220

[56] References Cited

U.S. PATENT DOCUMENTS

| | | | |
|---|---|---|---|
| 2,842,230 | 7/1958 | MacPherson | 280/124.147 |
| 3,584,856 | 6/1971 | Desbois | 280/124.147 |
| 3,679,158 | 7/1972 | Pusch | 267/141.3 |
| 4,434,977 | 3/1984 | Chiba et al. | 280/124.155 |
| 4,486,028 | 12/1984 | Tanahashi | 280/124.147 |
| 4,681,304 | 7/1987 | Hassan | 267/220 |
| 4,810,003 | 3/1989 | Pinch et al. | 280/124.155 |
| 5,133,573 | 7/1992 | Kijima et al. | 267/33 |
| 5,248,134 | 9/1993 | Ferguson et al. | 267/220 |
| 5,251,928 | 10/1993 | Maeda | 267/195 |
| 5,261,650 | 11/1993 | Hein | 267/220 |
| 5,330,166 | 7/1994 | Aoki | 280/124.155 |
| 5,431,260 | 7/1995 | Gross et al. | 188/321.11 |
| 5,676,355 | 10/1997 | Hayashi et al. | 267/33 |

Primary Examiner—Douglas C. Butler
Attorney, Agent, or Firm—McDermott, Will & Emery

[57] ABSTRACT

A mount insulator is structured by a core metal body, installed at a fixed side and including an almost flat intermediate flange section having a piercing hole at an axial center section and a ring-shaped wall section extensively provided at the outer periphery of the intermediate flange in the direction of both sides crossing the intermediate section, and a mount elastic body section integrally fixed and formed with both sides of the intermediate flange section, an inner peripheral surface of the piercing hole and an inner peripheral surface of the ring-shaped wall section, and including an extension section expanded in a direction to cross the intermediate flange section and projecting from both wall sections, and a piercing supporting hole provided at the inner periphery side of the piercing hole of the intermediate flange section and piercing through between end surfaces of both extension sections of smaller diameter than that of the piercing hole and almost concentric with the piercing hole for piercingly support the axis section of a material to be mounted. Therefore, it is possible to restrict damaging of the mount insulator and generation of abnormal noise.

6 Claims, 5 Drawing Sheets

MOUNT INSULATOR

BACKGROUND OF THE INVENTION

The present invention relates to a mount insulator to be used for elastically supporting a shock absorber of a suspension at the car body side.

This type of mount insulator has so far been provided between the upper section of the shock absorber and the car body side. The shock absorber is structured by a rod section and a cylinder section. A rear spring bumper is provided to surround the shock absorber, and a first retainer, the shock absorber and a second retainer are provided in a stacked state at the upper section of the rear spring bumper. The rod section passes through the first retainer, the shock absorber and the second retainer, and at the upper portion of the second retainer, and a nut is fastened to a male screw section formed at the front end of the rod section. By the fastening of this nut, a mount insulator is mounted between the first retainer and the second retainer. A coiled spring is provided outside the shock absorber. The upper and lower positions of the coiled spring are restricted by coiled spring receiver provided at a cylinder section of the shock absorber and by the mount insulator.

The mount insulator is structured by a core metal body fixed to a strut housing at the car body side, a rubber elastic section having a piercing hole (viz., through hole), and an inner cylinder section mounted in the piercing hole of the elastic body section and having the rod section pierced (viz. disposed) through a bore section of the inner cylinder section.

The core metal body is formed in approximately a disk shape, and a hole section having a larger diameter than the outer diameter of the inner cylinder is provided at approximately the center portion of the core metal body. A rising section projecting upwards is provided at the periphery of the hole section. The outer periphery side of the core metal body structures a spring sheet section.

A mount elastic body section of the elastic body section is fixedly formed on both the upper and lower surfaces of the core metal body, on an inner periphery surface of the hole section and the rising section, and on the outer periphery surface of the inner cylinder section respectively. A spring receiving elastic body is fixedly formed on the lower surface of the spring sheet section. The spring receiving elastic body is integrated with the mount elastic body to structure the elastic body section. The mount elastic body section is expansively formed in the axial direction of the inner cylinder section, and the upper and lower ends of the inner cylinder and the mount elastic body section are on almost the same plane.

The mount insulator is mounted in the state that the rod section is inserted in the inner cylinder section and that the inner cylinder section and the mount elastic body section are sandwiched between the first and second retainers. In the spring sheet section, the coiled spring is received by the spring receiving elastic body section. Accordingly, both the shock absorber and the coiled spring are elastically supported by the strut housing at the car body side.

However, since the core metal body is formed in almost a disk shape in the above-described type of mount insulator, the mount elastic body section is easily deformed to escape in the lateral direction. Therefore, when a force is applied in a direction perpendicular to the axis of the rod section due to the entangled stiffness of a lower bush of the shock absorber, the rod section and the inner cylinder section are inclined to the lateral direction with respect to the core metal body fixed to the strut housing. Accordingly, since the mount elastic body section is strongly compressed between the rising section of the core metal body and the inner cylinder section, there is a problem that the mount elastic body section is easily damaged. Particularly, since the rising section becomes an edge, the mount elastic body section is easily damaged.

Further, since the mount insulator integrally holds the inner cylinder section and is sandwiched by the retainers on both sides, it is not possible to apply a preliminary pressure to the mount elastic body section even if the nut is fastened. Accordingly, there arises a problem that the retainers and the upper and lower ends of the mount elastic body section are brought into contact with each other or are separated from each other when a damping force of the shock absorber is applied or when a force is applied in upward and downward directions by the rear spring bumper. This further leads to such problems that abnormal noise is generated and that the mount elastic body section is damaged by sands that enter in the gap between the retainers and the upper and lower ends of the mount elastic body section.

SUMMARY OF THE INVENTION

It is an object of the present invention to provide a mount insulator which is not easily damaged or which does not generate abnormal noise In order to achieve the above-described object, the mount insulator according to the present invention is structured by a core metal body, installed at a fixed side and including an almost flat intermediate flange section having a piercing hole at an axial center section and a ring-shaped wall section extensively provided at the outer periphery of the intermediate flange in the direction of both sides crossing the intermediate section, and a mount elastic body section integrally fixed and formed with both sides of the intermediate flange section, an inner peripheral surface of the piercing hole and an inner peripheral surface of the ring-shaped wall section, and including an extension section expanded in a direction to cross (viz., extend away from) the intermediate flange section and projecting from both wall sections, and a piercing supporting hole provided at the inner periphery side of the piercing hole of the intermediate flange section and piercing through between end surfaces of both extension sections of smaller diameter than that of the piercing hole and almost concentric with the piercing hole for piercingly support the axis section of a material to be mounted.

Accordingly, it is possible to install the axis section of the material to be mounted by piercing the axis section of the material to be mounted through the piercing supporting hole of the mount elastic body section and by fastening both end surfaces of the extension section of the mount elastic body section. The mount insulator is installed at the fixed side of the core metal body. When a force is applied in a perpendicular direction to the axis section of the member to be mounted and when the axis section is about to be inclined to the core metal body, the move of the outer periphery side of the mount elastic body section is restricted by the ring-shaped wall section of the core metal body so that the inclination of the axis section is restricted. Accordingly, a strong compression of the mount elastic body section between the axis section and the inner periphery of the piercing hole of the flange section can be constrained so that it is possible to restrict damaging of the mount elastic body section.

Further, the mount elastic body section can be installed while applying a preliminary pressure to it by fastening the end surface of the extension section of the mount elastic body section to the axis section of the material to be mounted. Therefore, it is possible to constrain a separation of a junction between the end surface of the extension section and the axis section, and it is also possible to restrict generation of abnormal noise and damaging of the mount elastic body section due to the inclusion of foreign materials.

Accordingly, the mount insulator of which mount elastic body section is not easily damaged as a whole can be obtained. Further, it is also possible to restrict the end surface of the extension section from being brought into contact with, or being separated from, the axis section of the material to be mounted at the junction surface, so that generation of abnormal noise can be restricted.

Further, it is also possible to have a structure comprising a spring sheet section integrally extended from one wall section of the core metal body to the outer periphery direction and a spring receiving elastic body section provided at the spring sheet section to bear an input applied from a coiled spring.

With the above-described structure, the coiled spring can be received by the spring receiving elastic body section of the integrated spring sheet section, and an input from the coiled spring can also be elastically supported through the mount insulator.

The mount elastic body section can also be set to a higher hardness than that of the spring receiving elastic body section.

According to the above-described structure, the axis section of the material to be mounted by the mount insulator can be supported more securely with the higher hardness of the mount elastic body section than that of the spring receiving elastic body section. Accordingly, an occurrence of damaging of the mount elastic body section and generation of abnormal noise can be prevented more securely.

Further, it is also possible to have such a structure that the intermediate flange section is divided into a thickness direction to have a pair of matching sections integral with each ring-shaped wall section, and the matching sections are matched to have a mutually increased fastening of the inner periphery.

According to the above-described structure, no edge section is present because the piercing hole of the intermediate flange section is fastened, so that the mount elastic body section can be applied to the fastened piercing hole. Therefore, damaging of the mount elastic body section can be restricted more securely by the piercing hole.

Further, it is also possible to have such an arrangement that the fixed side at which the core metal body is installed is the car body side and the material to be mounted is a shock absorber of the car.

DESCRIPTION OF THE PREFERRED EMBODIMENTS

The state of one embodiment of the present invention will be explained below with reference to drawings.

Figure 1:
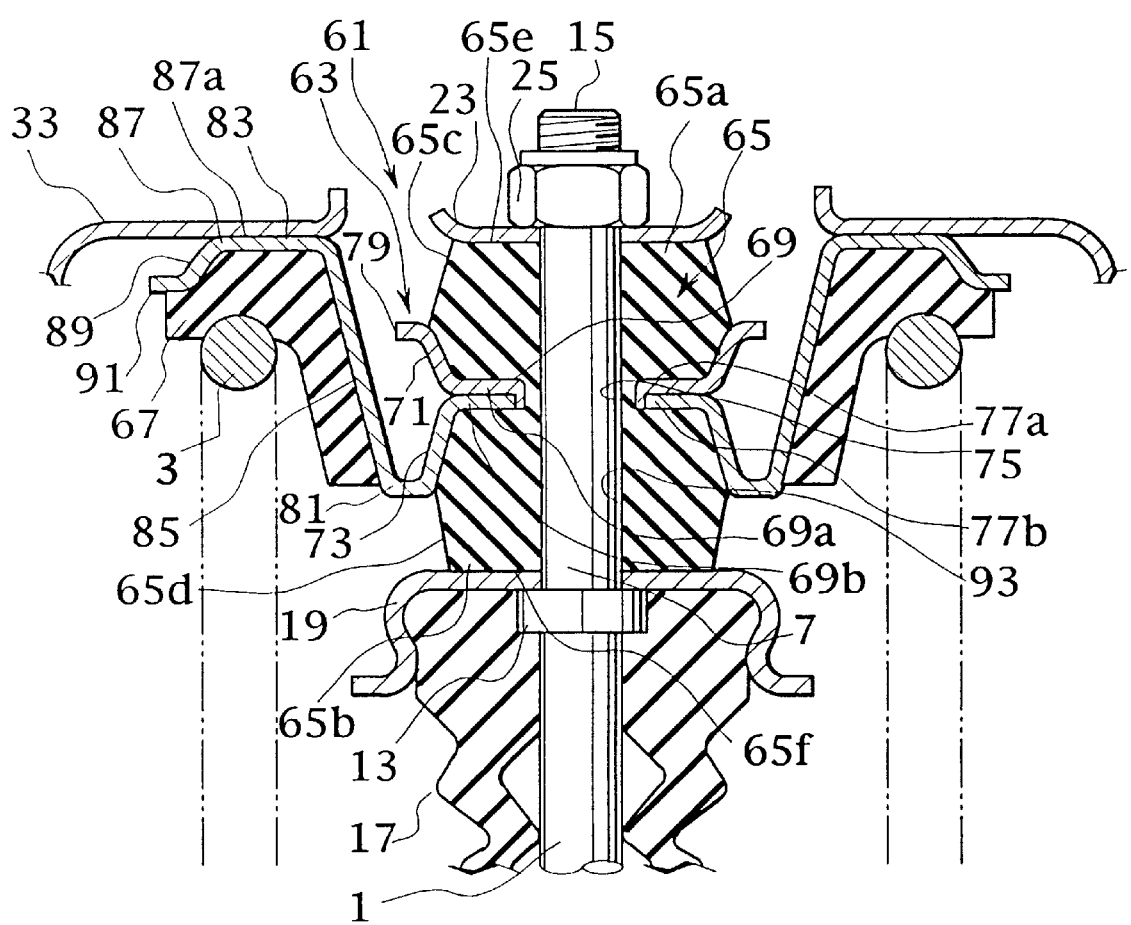
FIG. 1 is a cross sectional diagram for showing a state that a shock absorber is mounted by a mount insulator relating to one embodiment of the present invention.
Figure 2:
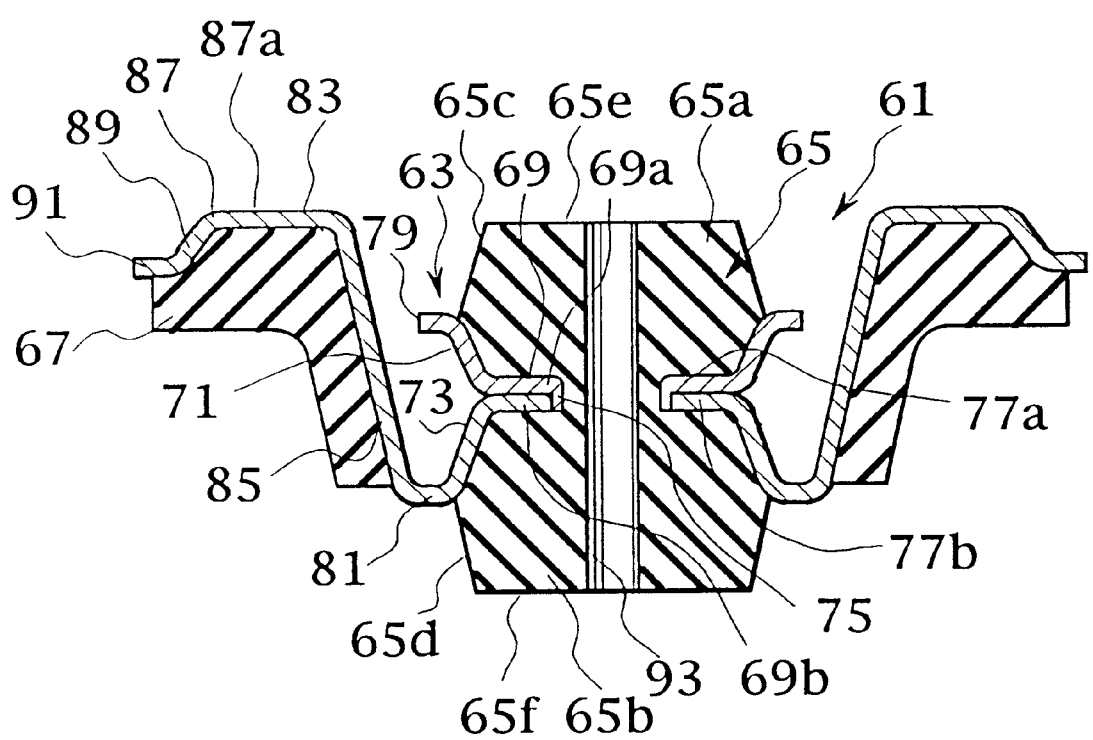
FIG. 2 is a cross sectional diagram of the mount insulator in FIG. 1.
Figure 3:
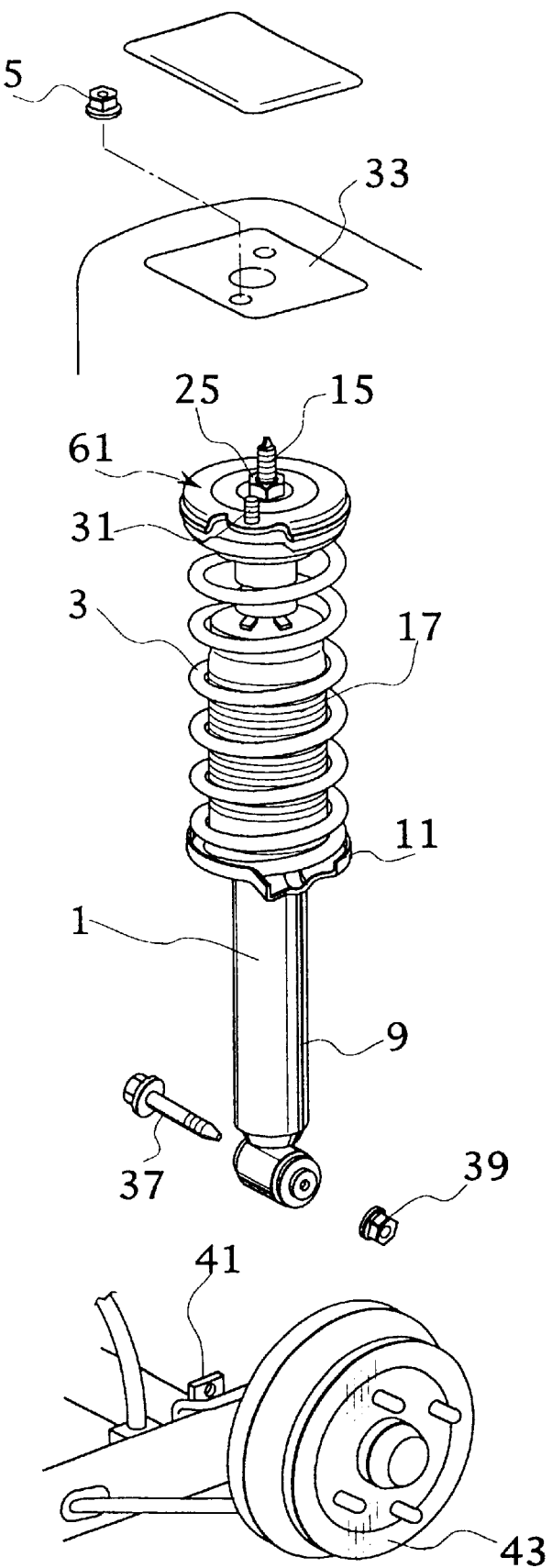
FIG. 3 is a broken-down perspective view for showing a relationship among a shock absorber, a coil spring, a mount insulator and a car body side.
Figure 4:
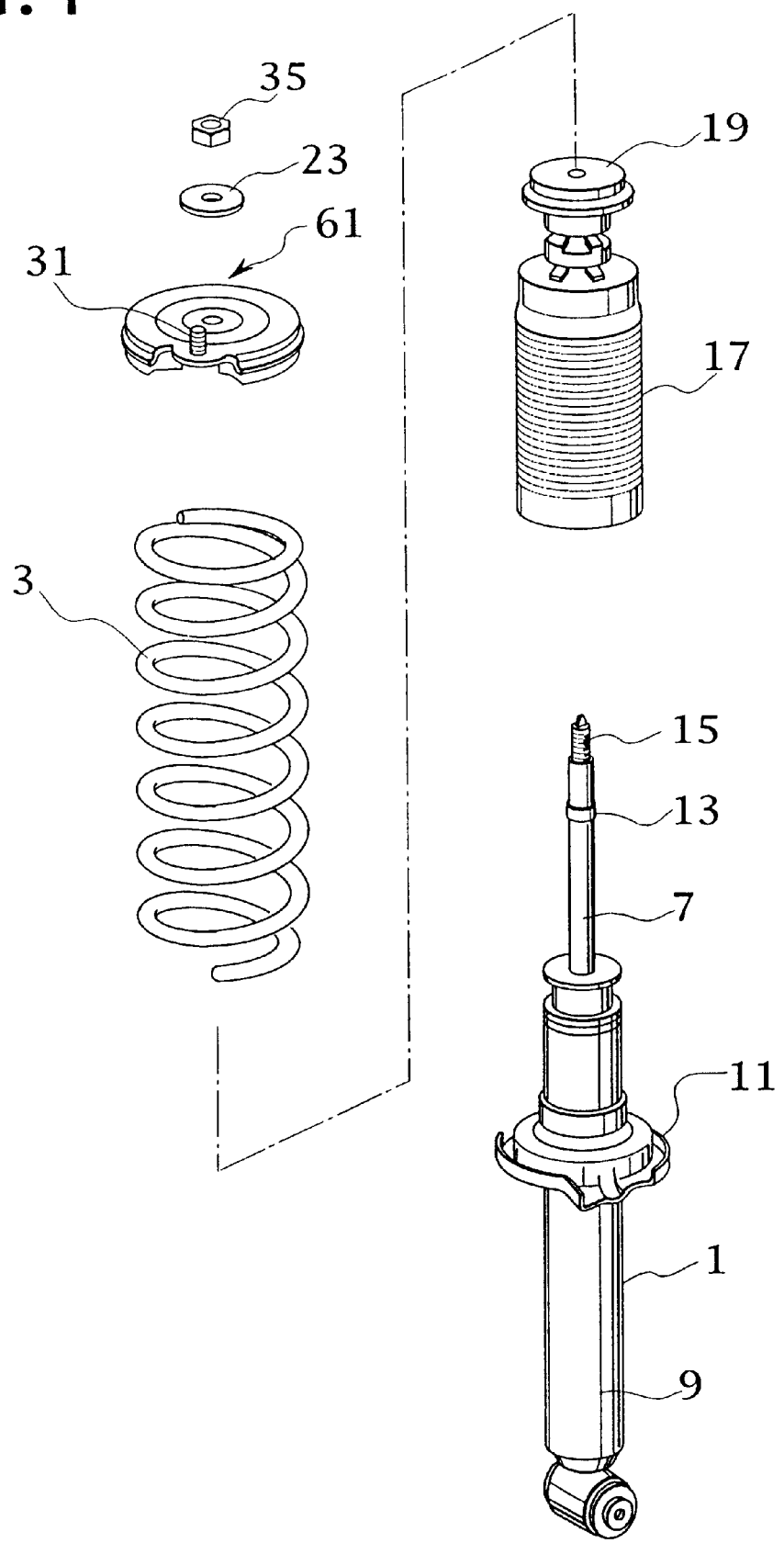
FIG. 4 is a broken-down perspective view for showing a relationship among a shock absorber, a coil spring and a mount insulator.
Figure 5:
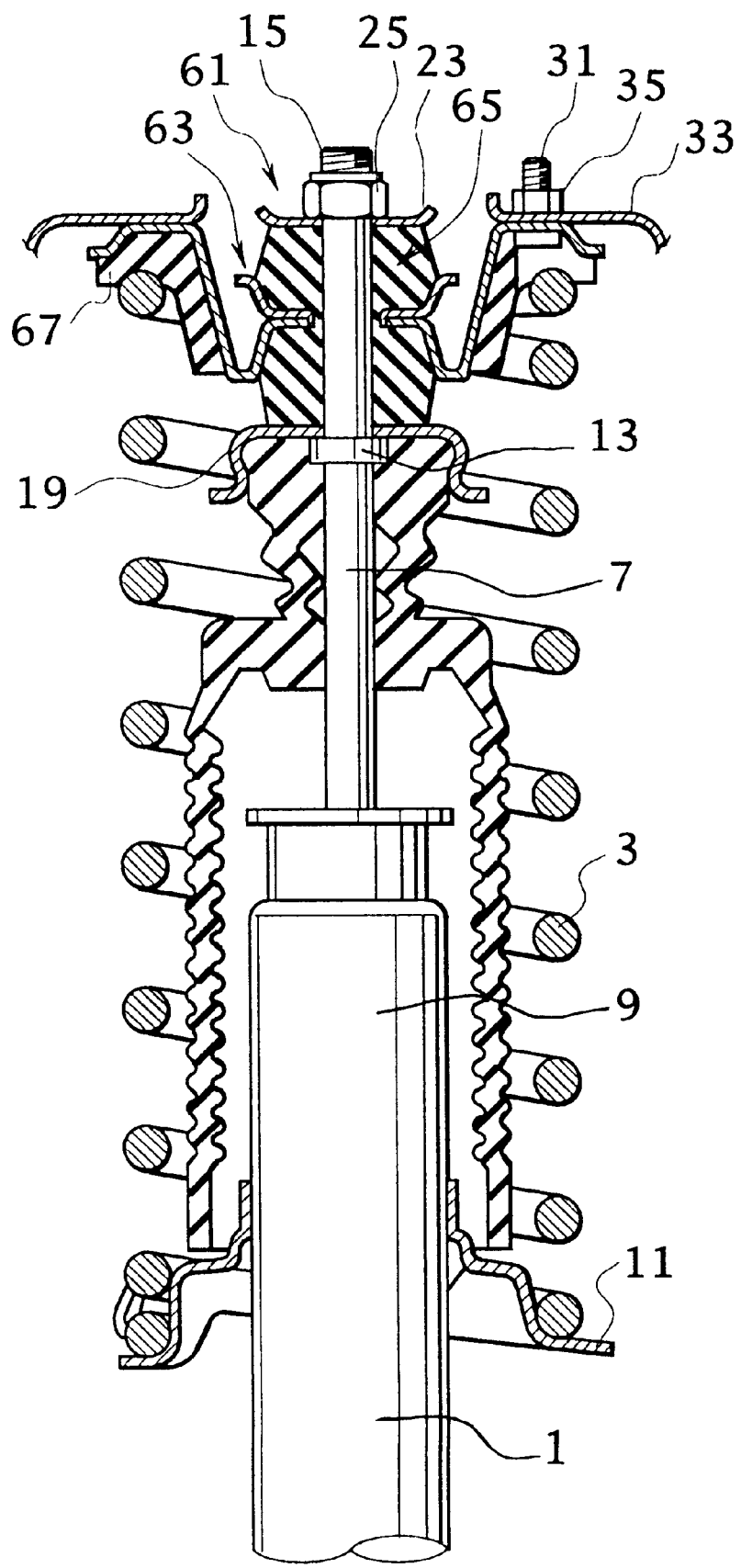
FIG. 5 is a cross-sectional diagram for showing a state that a shock absorber is supported at the car body side through a mount insulator.

FIG. 1 is a cross sectional diagram for showing a state that a shock absorber is mounted by a mount insulator relating to one embodiment of the present invention, FIG. 2 is a cross sectional diagram of the mount insulator in FIG. 1, FIGS. 3 and 4 are broken-down perspective view for showing a relationship among a shock absorber, a coil spring, a mount insulator and a car body side, and FIG. 5 is a cross-sectional diagram for showing a state that a shock absorber is supported at the car body side through a mount insulator.

As shown in FIGS. 3 to 5, a shock absorber 1 is structured by a rod section 7 and a cylinder section 9. A coiled spring receiver 11 is fixed to the shock absorber 1. At the upper section of the rod section 7, an enlarged section 13 is provided, and at the front end the rod section 7, a male screw section 15 is provided.

A rear spring bumper 17 is provided to pierce through it a portion from the cylinder section 9 to the rod section 7. A retainer 19 is provided on the upper section of the rear spring bumper 17. The rod section 7 pierces through the retainer 19, and the retainer 19 is engaged with an enlarged section 13 of the rod section 7 from the upper side. At the upper side of the retainer 19, the rod section 7 pierces through the mount insulator 61. At the upper side of the mount insulator 61, a retainer 23 pierces through the rod section 7. At the front end section of the rod section 7 projected above the retainer 23, the male screw section 15 is formed, and a nut 25 is fastened to the male screw section 15. By the fastening of this nut 25, the mount insulator 61 is mounted between the retainers 19 and 23. A coiled spring 3 is provided between the mount insulator 61 and the coiled spring receiver 11.

The mount insulator 61 is structured by a core metal body 63, amount elastic body section 65 and a spring receiving elastic body section 67, as shown in FIG. 5. A bolt 31 piercing through a fitting hole formed on a strut housing 33 of the car body side is fixed at the core metal body 63 of the mount insulator 61. By fastening the bolt 31 with a nut 35, the mount insulator 61 (core metal body 63) is fixed to the strut housing 33.

As shown in FIG. 3, the lower end portion of the cylinder section 9 is fitted to a bracket 41 at the side of an accelerator side. In FIG. 3, a symbol 43 denotes a rear wheel hub.

Accordingly, shocks from the running vehicles can be absorbed by the coiled spring 3 and vibrations can be attenuated by the shock absorber 1.

Further, the mount insulator 61 supports the shock absorber 1 and the coiled spring 3 to the strut housing 33 at the car body side while restricting the transmission of vibrations from the shock absorber 1 and the coiled spring 3.

As shown in FIGS. 1 and 2, the core metal body 63 of the mount insulator 61 has an almost flat intermediate flange section 69 and upper and lower ring-shaped wall sections 71 and 73. A piercing hole 75 is provided at the axial core section of the intermediate flange section 69.

The intermediate flange section 69 is structured by a pair of upper and lower matching sections 69a and 69b that can be separated into two in the thickness direction (in vertical direction in the present embodiment) of the intermediate flange section 69. Both matching sections 69a and 69b are superposed in a vertical direction, and an inner periphery section 77a of the upper matching section 69a is fastened to cover an inner periphery section 77b of the lower matching section 69b so that there is no edge in the piercing hole 75.

The upper and lower ring-shaped wall sections 71 and 73 are extensively provided on both sides (upper and lower sided in the present embodiment) in the direction to cross the upper and lower surfaces of the intermediate flange section 69. The upper wall section 71 is formed in a slope to be gradually extended upwards from the outer periphery section of the upper matching section 69a. The lower wall section 73 is formed in a slope to be gradually extended downwards from the outer periphery section of the lower matching section 69b. The upper and lower wall sections 71 and 73 are formed approximately in upper and lower symmetrical shape in the state that upper and lower matching sections 69a and 69b are matched together. At the whole periphery of the upper edge of the upper wall section 71, an upper edge flange section 79 is formed toward the outer periphery side. At the lower edge of the lower wall section 73, a lower edge flange section 81 is formed toward the outer periphery side.

At the outer periphery section of the flange section 81, a spring sheet 83 is integrally extended. In other words, the spring sheet section 83 is integrally extensively structured from the ring-shaped wall section 73 to the outer periphery direction. The spring sheet section 83 is formed in a slope to gradually extend upwards, and has an extended wall section 85 which is extended further above the upper edge flange section 79 of the upper wall section 71. At the upper edge of the extended wall section 85, a receiving flange section 87 is provided to extend towards the outer periphery side. At the outer periphery of the receiving flange section 87, a slightly stated wall 89 is provided to gradually extend downwards, and at the lower edge of the staged wall 89, a flange section 91 is provided to extend towards the outer periphery side.

The mount elastic body section 65 is fixedly formed integrally with the inner peripheral surface of the piercing hole 75 of the intermediate flange section 69, the upper and lower surfaces of the intermediate flange section 69 and the inner peripheral surface of the upper and lower ring-shaped wall sections 71 and 73. The mount elastic body section 65 is expanded in the direction to cross the upper and lower surfaces (a vertical direction) of the intermediate flange section 69, and has an extension section 65a stretched beyond both walls 71 and 73. An outer periphery surface 65c of the upper extension section 65a is formed as a tapered surface gradually sloped towards the upper inner periphery from the upper edge of the upper wall section 71. An outer periphery surface 65d of a lower extension section 65b is formed as a tapered surface gradually sloped towards the lower inner periphery from the lower edge of the lower wall section 73. Upper and lower end surfaces 65e and 65f of the extension sections 65a and 65b are formed flat. The end surface 65e of the upper extension section 65a is formed to almost on the same plane as an upper surface 87a of the receiving flange section 87.

A piercing supporting hole 93 is provided in the mount elastic body section 65. The piercing supporting hole 93 is of a smaller diameter than that of the piercing hole 75 of the intermediate flange section 69 and is provided at the inner side of the piercing hole 75 so that the piercing supporting hole is concentric with the piercing hole 75. The piercing supporting hole 93 pierces through between the upper and lower end surfaces 65e and 65f of the upper and lower extension sections 65a and 65b. The rod section 7 of the shock absorber 1 directly pierces through the piercing supporting hole 93 of the mount elastic body section 65 and the piercing supporting hole 93 directly supports the rod section 7.

The spring receiving elastic body section 67 is fixedly formed at the lower surface side of the spring sheet section 83. In other words, the spring receiving elastic body section 67 is provided at the portions from the extended wall section 85 of the spring sheet section 83 to the flange section 91 through the receiving flange section 87.

In the present embodiment, the mount elastic body section 65 has a higher hardness than that of the spring receiving elastic body section.

When the mount insulator 61 structured in the manner as described above is installed to the front end of the rod section 7, the nut 25 is fastened in engagement with the male screw section 15 of the rod section 7 projected above the retainer 23. When the nut 25 is fastened, the gap between the upper and lower retainers 19 and 23 is narrowed, so that the upper and lower retainers 19 and 23 pressures the upper and lower end surfaces 65e and 65f of the mount elastic body section 65 to provide the mount elastic body section 65 with a preliminary pressure in the rod axis direction. At the spring sheet section 83, the spring elastic receiving body section 67 receives the coiled spring 27. With the mount insulator 61 thus installed, the shock absorber 1 and the coiled spring 3 are elastically supported by the strut housing 33 at the car body side.

According to the above-described structure, even if a force is applied in a direction perpendicular to the axis of the rod section due to the entangled stiffness of a lower bush of the shock absorber 1 and when the rod section 7 is inclined to the lateral direction with respect to the core metal body 63, strong pressuring of the rod section 7 to the piercing hole 75 of the intermediate flange section 69 is restricted because the mount elastic body section 65 is securely received by the upper and lower wall sections 71 and 73 of the core metal body 63. Therefore, damaging of the mount elastic body section 65 between the rod section 7 and the piercing hole 75 of the intermediate flange section 69 can be restricted. Further, since the piercing hole 75 is increasingly fastened, this also helps to restrict the damaging of the mount elastic body section 65.

Further, since the deformation of the mount elastic body section 65 in a way to escape to the outer periphery is substantially restricted by the restriction of the upper and lower wall sections 71 and 73, the displacement quantity can be minimized. Moreover, the problem that the end surfaces 65e and 65f of the mount elastic body section 65 and the retainers 19 and 23 are brought into contact with each other or are separated from each other can be restricted. This further can restrict the generation of abnormal noise and the damaging of the mount elastic body section 65 due to the existence of sands.

Further, since a preliminary pressure is being applied from the retainers 19 and 23 to the end surfaces 65e and 65f of the mount elastic body section 65, this also helps to substantially restrict the problem of the contact and separation between the end surfaces 65e and 65f and the retainers 19 and 23, and can securely prevent the generation of abnormal noise and the damaging due to the existence of sands.

What is claimed is:

1. A mount insulator, comprising:
   a metal core body installed on a fixed member and including a plate-shaped intermediate flange and ring-shaped walls, the intermediate flange having a center hole, the ring-shaped walls extending from the intermediate flange on both sides thereof in in opposite directions away from the intermediate flange; and an elastic mount body arranged on both sides of the intermediate flange and formed integrally through the hole, the elastic mount body being in contact with both surfaces of the intermediate flange, an inner peripheral surface of the hole and inner peripheral surfaces of the ring-shaped walls, the mount elastic body including extension portions and a supporting hole, each of the extension portions expanding away from the intermediate flange and projecting from each of the ring-shaped walls, the supporting hole extending between end surfaces of both extension portions and supporting a mounted member which is disposed therethrough;

a spring sheet integrally extending from one of the ring-shaped walls outwardly; and a spring receiving elastic body on the spring sheet and receiving an elastic force from a coiled spring.

2. A mount insulator according to claim 1, wherein the mount elastic body has a higher hardness than that of the spring receiving elastic body.

3. A mount insulator according to claim 1, wherein the intermediate flange is divided into a thickness direction to have a pair of matching sections integral with each the ring-shaped walls, and the matching sections are matched to each other and an inner peripheries thereof are fastened each other.

4. A mount insulator according to claim 1, wherein the fixed side on which the metal body core is installed is a vehicle side, and the mounted member comprises a shock absorber for a vehicle.

5. A mount insulator, comprising:

a unitary elastomeric body having upper and lower portions, and a through bore which extends through the upper and lower portions and which is adapted to receive an upper portion of a shock absorber;

a flange structure having a through hole through which said elastomeric body is disposed so that the upper and lower portion respectively engage upper and lower surfaces of said flange structure, said flange structure being formed of an upper member and a lower member, the lower member having an extended wall section which extends up past the upper member and is adapted to abut and to be rigidly connected to a strut housing of an automotive vehicle, said extended wall portion including a spring seat having a spring receiving elastomeric body fixed to an outboard surface against which an upper end of a spring can apply a compressive force.

6. A mount insulator according to claim 5, wherein the spring receiving elastomeric body is softer than the unitary elastomeric body.

* * * * *